(12) United States Patent
Chang (10) Patent No.: US 9,223,075 B2
(45) Date of Patent: Dec. 29, 2015

(54) DIRECT TYPE BACKLIGHT MODULE

(71) Applicant: HON HAI PRECISION INDUSTRY CO., LTD., New Taipei (TW)

(72) Inventor: Shao-Han Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/496,581

(22) Filed: Sep. 25, 2014

(65) Prior Publication Data

US 2015/0131315 A1  May 14, 2015

(30) Foreign Application Priority Data

Nov. 8, 2013 (CN) .......................... 2013 1 0550079

(51) Int. Cl.
*G02F 1/1335* (2006.01)
*F21V 8/00* (2006.01)

(52) U.S. Cl.
CPC ............ *G02B 6/0031* (2013.01); *G02B 6/0028* (2013.01); *G02B 6/0055* (2013.01); *G02B 6/0075* (2013.01)

(58) Field of Classification Search
CPC .. G02B 6/0031; G02B 6/0028; G02B 6/0055; G02B 6/0075; F21V 14/06; F21V 5/04; F21V 5/045; F21V 14/02; F21K 9/50
USPC ................................. 362/97.2, 203
See application file for complete search history.

(56) References Cited

U.S. PATENT DOCUMENTS

| 8,596,807 | B2* | 12/2013 | Jeong et al. ................... 362/97.2 |
| 2011/0211335 | A1* | 9/2011 | Ko ............................... 362/97.1 |
| 2015/0124434 | A1* | 5/2015 | Chang .......................... 362/97.3 |
| 2015/0168775 | A1* | 6/2015 | Chang ................ G02F 1/33605 |
| 2015/0168781 | A1* | 6/2015 | Chang ............... G02F 1/133524 |

FOREIGN PATENT DOCUMENTS

| CN | 102425740 A | 4/2012 |
| TW | 201213974 A1 | 4/2012 |

* cited by examiner

*Primary Examiner* — Tracie Y Green
(74) *Attorney, Agent, or Firm* — Novak Druce Connolly Bove + Quigg LLP (57) ABSTRACT

A backlight module includes a light guide assembly and a light source assembly. The light guide assembly includes a back cover, a reflective sheet, a light guide plate, and an optical film. The light source assembly includes a lamp cover, a light plate, and a plurality of light sources. The back cover and the reflective sheet define a first opening and a second opening. The light guide plate includes two prism shaped protrusion portions parallel to each other, and two surfaces of the two protrusion portions facing each other are a first incident portion and a second incident portion inclined to the light guide plate, and an area between the first incident surface and the second incident surface is third incident surface. The protrusion portions extend into the lamp cover, and the light source assembly is positioned below the third incident portion.

10 Claims, 8 Drawing Sheets

DIRECT TYPE BACKLIGHT MODULE

FIELD

The present disclosure relates to the field of liquid crystal display, and in particular to a direct type backlight module.

BACKGROUND

Liquid crystal display apparatus having a thin profile, light weight and low power consumption have been used as monitors, for laptop computers, cellular phones, televisions, for example. A liquid crystal display apparatus includes a liquid crystal display panel displaying an image using light transmittance of liquid crystal and a backlight module disposed under a liquid crystal display panel to provide light to the liquid crystal display panel.

A backlight module includes a plurality of light sources generating light required to display an image on the liquid crystal display panel. For example, the light sources may include a cold cathode fluorescent lamp (CCFL), an external electrode fluorescent lamp (EEFL), a flat fluorescent lamp (FFL), and light emitting diodes (LEDs).

A backlight module can be classified as a direct type or as an edge type. In the direct type backlight module, the light sources are disposed under the liquid crystal display panel corresponding to an entire area of the liquid crystal display panel. A display apparatus having the direct type backlight module may have a relatively narrow bezel. In an edge type backlight module, the light sources are disposed under the liquid crystal display panel at a position corresponding to an edge portion of the liquid crystal display panel. A display apparatus having the edge type backlight module may be relatively thin.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

This disclosure is illustrated by way of example and not by way of limitation in the figures of the accompanying drawings in which like reference numbers indicate similar elements. It should be noted that references to "an" or "one" embodiment in this disclosure are not necessarily to the same embodiment, and such references mean "at least one."

Figure 1:
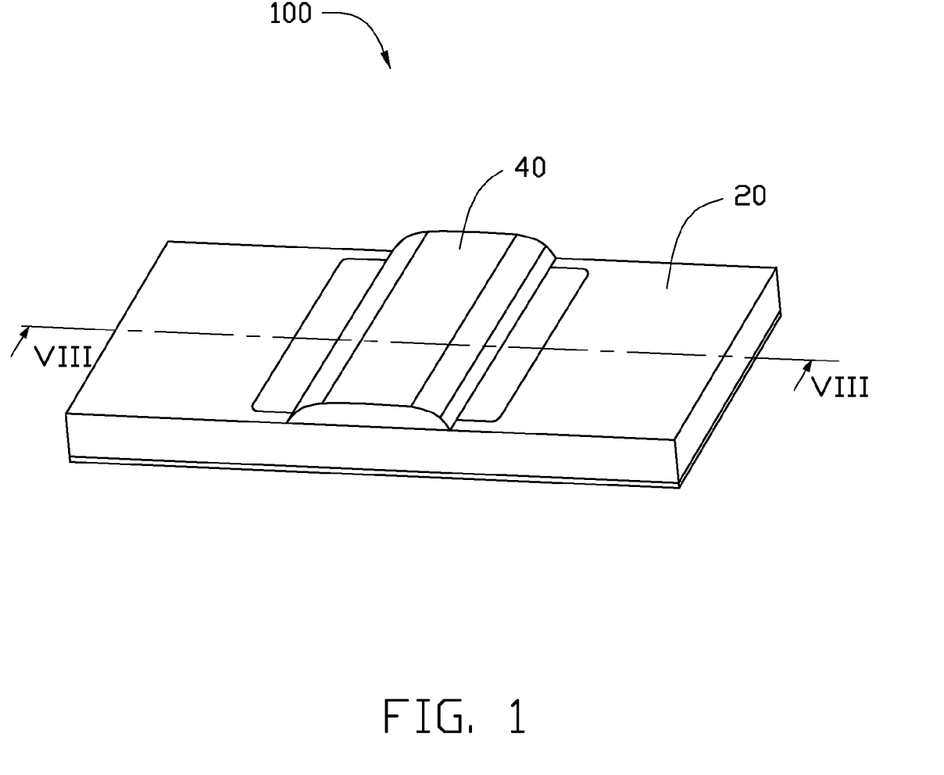
FIG. 1 is a perspective view of a backlight module according to an embodiment of this disclosure.

FIG. 1 illustrates a backlight module 100 according to an illustrated embodiment of this disclosure. The backlight module 100 can include a light guide assembly 20 and a light source assembly 40, and the light source assembly 40 can be positioned at a position corresponding to a central portion of the light guide assembly 20.

Figure 2:
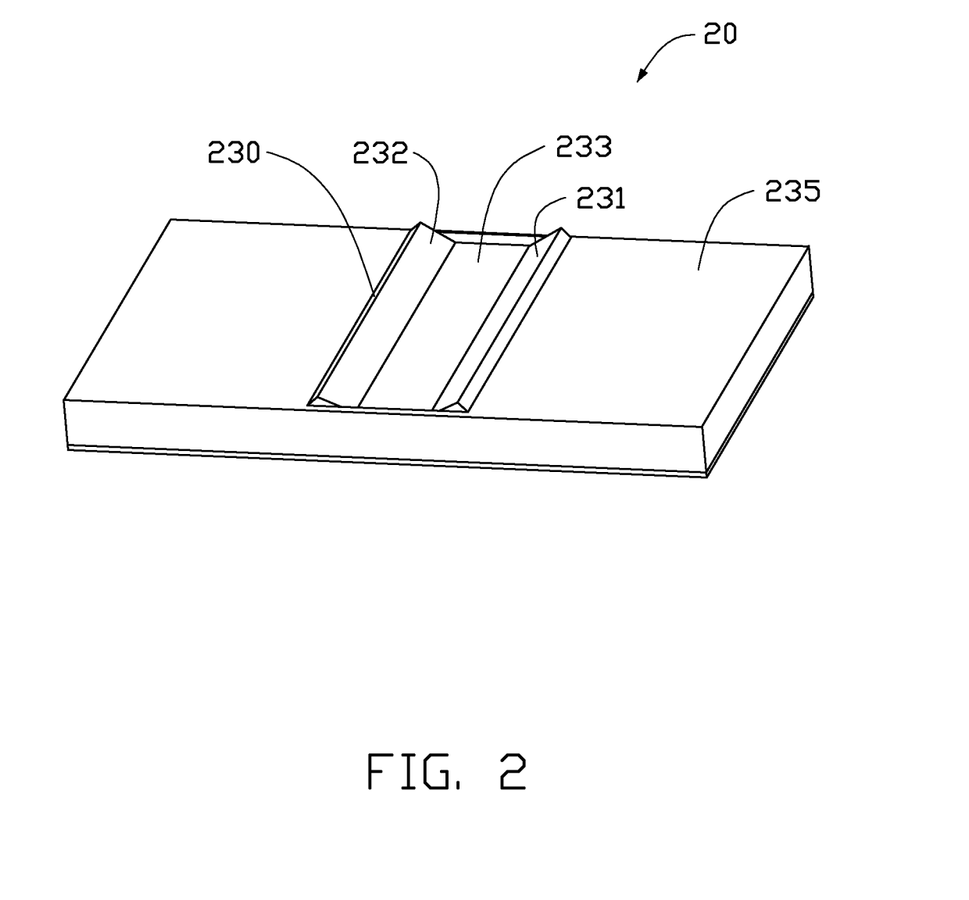
FIG. 2 is a perspective view of a light guide assembly of the backlight module as shown in FIG. 1.
Figure 3:
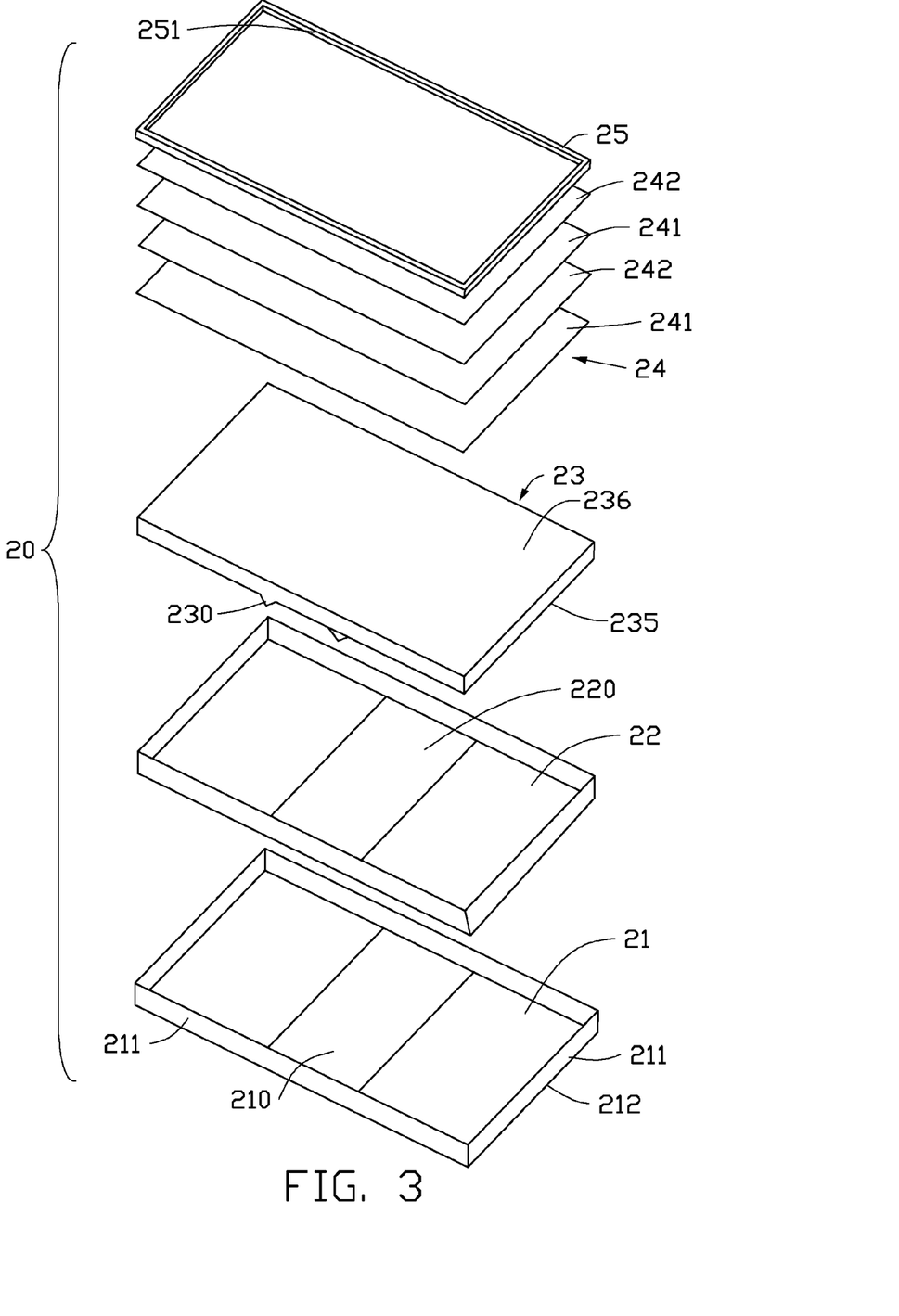
FIG. 3 is an exploded perspective view of the light guide assembly as shown in FIG. 2.

FIG. 2 and FIG. 3 illustrate that the light guide assembly 20 can include a back cover 21, a reflective sheet 22, a light guide plate 23, an optical film 24, and a plastic frame 25. The reflective sheet 22 can be attached on the inner surface of the back cover 21. The light guide plate 23 and the optical film 24 can be positioned in the back cover 21.

The back cover 21 can include four walls 211 and a bottom plate 212. The four walls 211 and the bottom plate 212 can cooperatively define a receiving recess. The bottom plate 212 can define a first opening 210 in the central portion.

The reflective sheet 22 can be attached on the four walls 211 and the bottom plate 212 of the back cover 21, and can define a second opening 220 in the central portion. The shape and size of the second opening 220 can be substantially the same as that of the first opening 210, and the second opening 220 can overlap with the first opening 210. The reflective sheet 22 can be made of materials with high reflectance.

The light guide plate 23 can include a first surface 235 adjacent to the reflective plate 22 and a second surface 236 adjacent to the optical film 24. The first surface 235 can be a light incident surface and the second surface 236 can be a light emitting surface. The central portion of the first surface 235 can define two protrusion portions 230 positioned parallel and spaced with each other. The protrusion portion 235 can be substantially three-sided prism shaped, and the cross-section of the protrusion portion 235 can be V-shaped. The protrusion portions 230 can be integrated with the light guide plate 23.

The surfaces of the two protrusion portions 230 facing each other can be defined as a first incident portion 231 and a second incident portion 232. The first incident portion 231 and the second incident portion 232 can be inclined with the first surface 235 of the light guide plate 23. In the illustrated embodiment, an angle between the first incident portion 231 and the first surface 235 or the second incident portion 232 and the first surface 235 can be in a range from about 30 degrees to about 45 degrees. An area between the first light incident portion 231 and the second incident portion 232 can be defined as a third incident portion 233. The two protrusion portions 230 can protrude out of the bottom plate 212 through the first opening 210 of the bottom plate 21 and the second opening 220 of the reflective sheet 22.

The optical film 24 can include two diffusion sheets 241 and two prism sheets 242 stacked together, and the diffusion sheets 241 and the prism sheets 242 can be positioned alternatively. The plastic frame 25 can be a rectangular frame. In the illustrated embodiment, the plastic frame 25 can define at least one rim 251 protruding around the plastic frame 25 configured for holding a liquid crystal panel (not shown).

Figure 4:
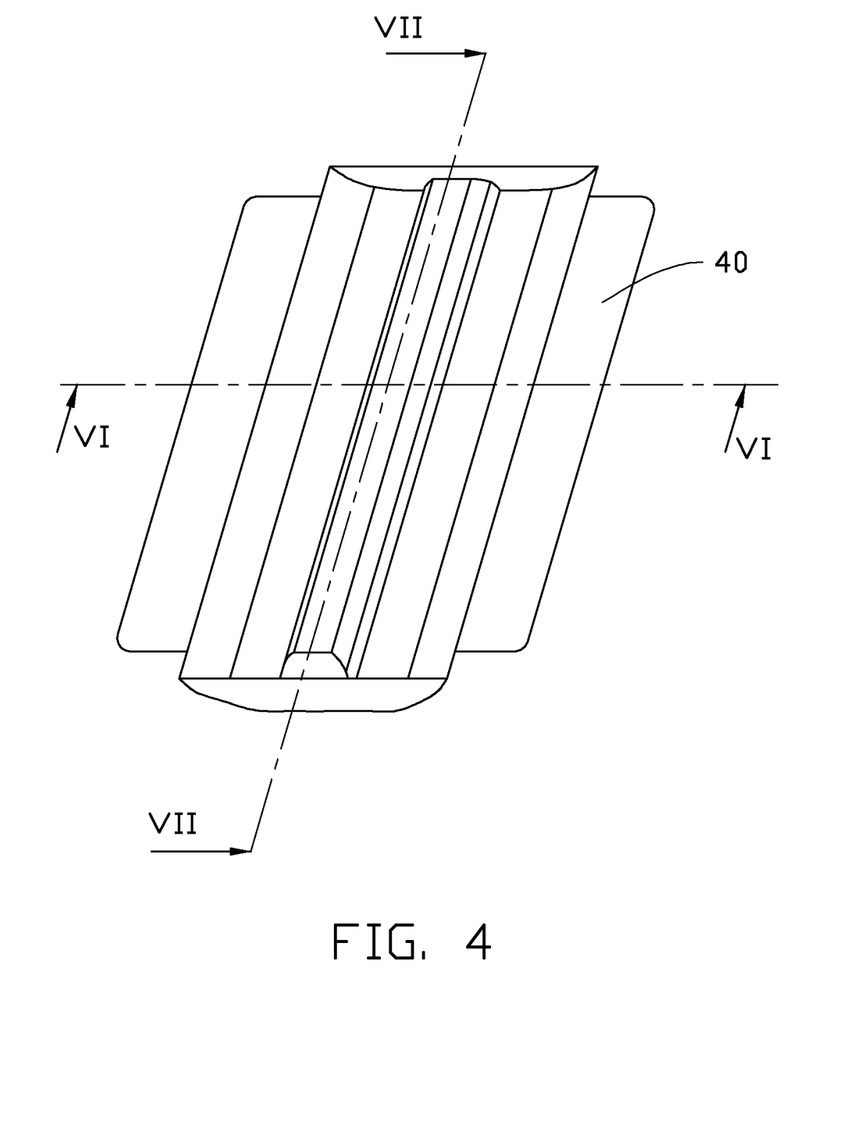
FIG. 4 is a perspective view of a light source assembly of the backlight module as shown in FIG. 1.
Figure 5:
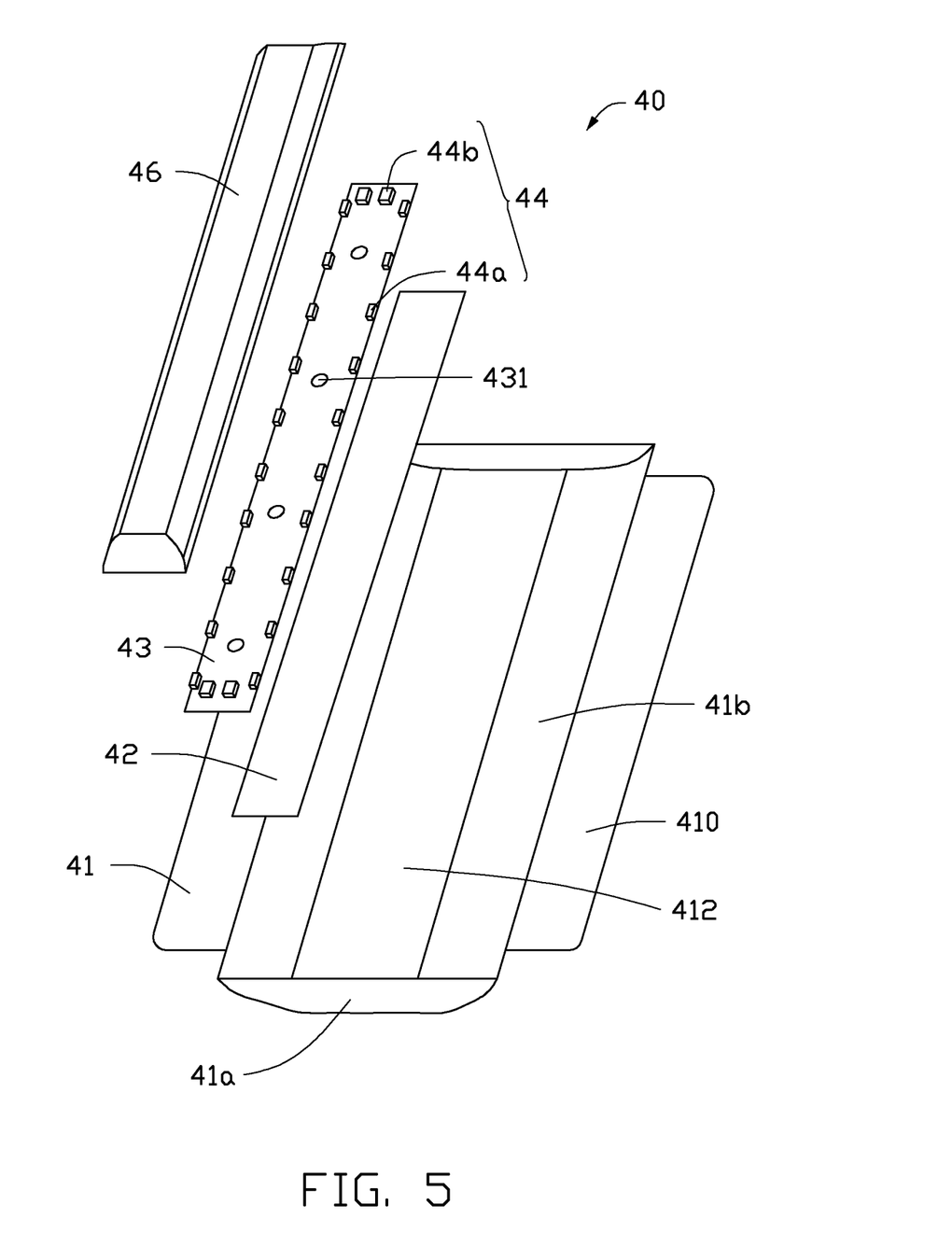
FIG. 5 is an exploded perspective view of the light source assembly as shown in FIG. 4.

FIG. 4 and FIG. 5 illustrate that the light source assembly 40 can include a lamp cover 41, a thermal gasket 42, a light plate 43, a plurality of light sources 44, and a light guide pipe 46. The thermal gasket 42, the light plate 43, the light sources 44, and the light guide pipe 46 can be received in the lamp cover 41 in order. In at least one embodiment, the light source 44 can be LED.

The lamp cover 41 can include a base plate 412, two first side walls 41a, two second side walls 41b, and two shoulders 410. The base plate 412, the two first side walls 41a and the two second side walls 41b can cooperatively define a receiving space. Each shoulder 410 can be connected with the second side wall 41b, and can extend parallel to the base plate 412.

The inner surface of the lamp cover 41 can be attached with a high-reflectance film (not shown), thereby the base plate 412, the first side walls 41a and the second side walls 41b are high-reflectance, and the lamp cover 41 can reflect the light emitted from the light sources 44.

The thermal gasket 42 can be strip shaped and attached on the base plate 412. The thermal gasket 42 can be positioned between the base plate 412 and the light plate 43, configured for diffusing heat from the light plate 43 and degreasing temperature of the light plate 43.

The light plate 43 can be strip shaped and define at least one hole 431. The light sources 44 can include a first light source pattern 44a positioned in a long direction on the light plate 43, and a second light source pattern 44b positioned in a short direction on the light plate 43. The first light source pattern 44a can transmit light to the light guide plate 23, and the second light source pattern 44b can transmit light to the light guide pipe 46 and the third incident portion 233.

Figure 6:
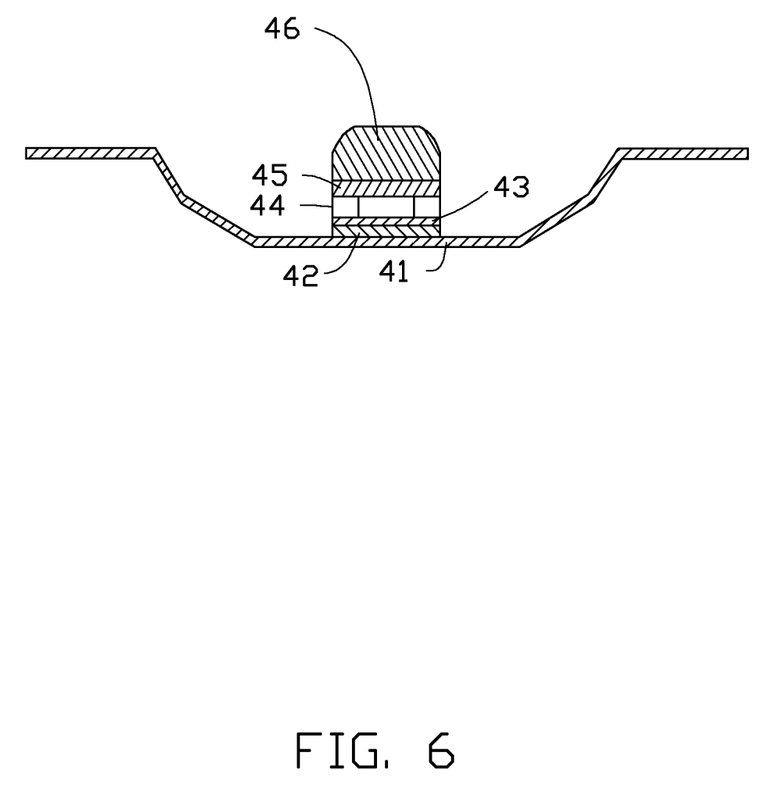
FIG. 6 is a cross-sectional view of the light source assembly taken along a line VI-VI of FIG. 4.
Figure 7:
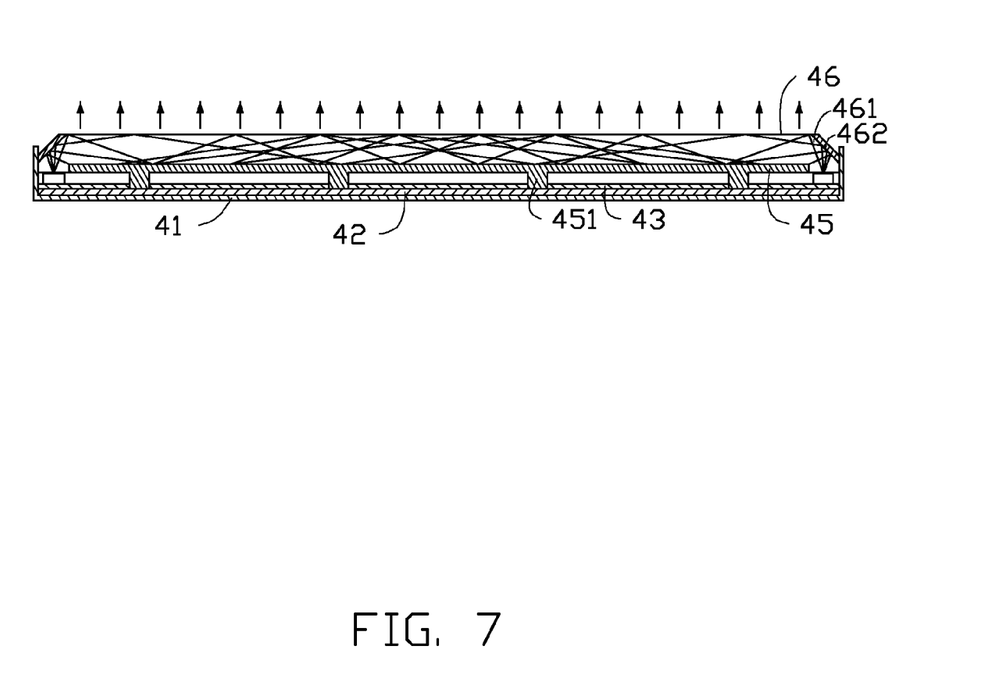
FIG. 7 is a cross-sectional view of the light source assembly taken along a line VII-VII of FIG. 4.

FIG. 6 and FIG. 7 illustrate that the light source assembly 40 can further include a bracket 45 positioned above the light sources 44. The bracket 45 can include at least one riveted column 451. The riveted column 451 can be riveted in the hole 431 of the lamp plate 43.

The lamp pipe 46 can be positioned on the bracket 45. In at least one embodiment, the bracket 45 can be integrated with the lamp pipe 46 of plastic materials with high reflectance. The bracket 45 can be used as a reflective film of the light guide pipe 46.

Two end surfaces in the long direction of the light guide pipe 46 can be two inclined surfaces 461. In at least one embodiment, each inclined surface 461 can be attached with a reflective film 462 to prevent light leakage.

Figure 8:
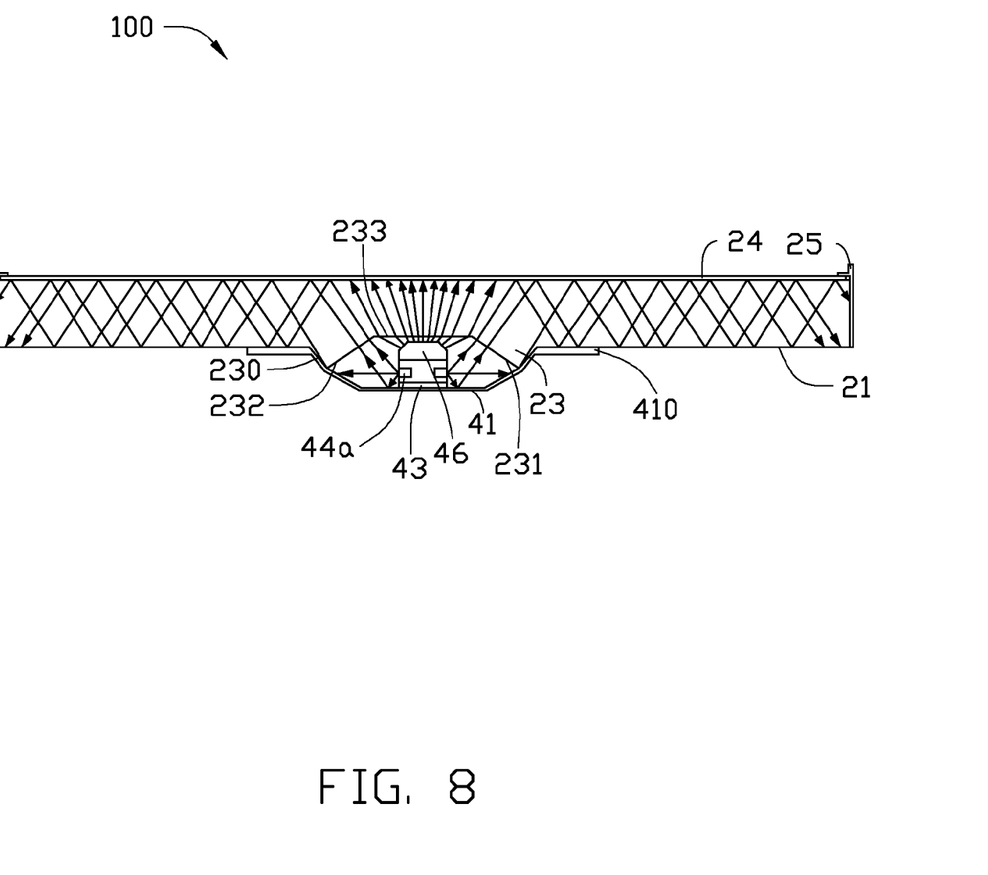
FIG. 8 is a cross-sectional view of the backlight module as shown in FIG. 1.

FIG. 8 illustrates that the protrusion portions 230 can extend out of the back cover 21 and extend into the lamp cover 41. The shoulders 410 can be attached on the back cover 21. The light guide pipe 46 can be received in the lamp cover 41 and can be positioned below the third incident portion 233. The light source assembly 40 can be disposed corresponding to the central portion of the light guide assembly 20 so that the backlight module 100 can have a narrow bezel and a thin thickness.

In use, the first light source pattern 44a can emit light and transmit the light to the light guide plate 23, configured as main light source of the light guide plate 23. The first incident portion 231, the second incident portion 232, and the third incident portion 233 can adjust the incident angle of the light input to the light guide plate 23. Then, the light incident to the light guide plate 23 can be reflected and transmitted to the optical film 24. The second light source pattern 44b can be used as main light source of the light guide pipe 46. The light from the second light source pattern 44b can be transmitted to the light guide pipe 46, and then transmitted to the third incident portion 233. As the light from the first light source pattern 44a are mainly incident to the first incident portion 231 and the second incident portion 232, the light from the second light source pattern 44b can be incident to the third incident portion 233 to compensate the brightness of the third incident portion 233. Then, the light can be transmitted to the optical film 24 and the liquid crystal panel, and a luminance and uniformity of the light can be improved. The backlight module 100 can realize both the luminance uniformity and thin design of liquid crystal display apparatus.

It is believed that the present embodiments and their advantages will be understood from the foregoing description, and it will be apparent that various changes can be made thereto without departing from the scope of the embodiments or the following claims.

What is claimed is:

1. A backlight module comprising:
   a light guide assembly comprising:
      a back cover having a first opening;
      a reflective sheet coupled to the back cover, the reflective sheet having a second opening overlapping with the first opening
      a light guide plate including two prism shaped protrusion portions parallel and spaced apart from each other, the two protrusion shaped portions having a first incident portion and a second incident portion that face each other and are inclined relative to a central axis of the light guide plate;
      an optical film mounted in the back cover, and
      a plastic frame fixedly coupled to the back cover;
   a light source assembly including a lamp cover, a light plate, and a plurality of light sources mounted on the light plate, and the light source assembly being positioned on the central portion of the light guide assembly; and
   a third incident portion formed between the first incident portion and the second incident surface, wherein two prism shaped protrusion portions extend out of the back cover and extend into the lamp cover, and the light source assembly is positioned below the third incident portion.

2. The backlight module as claimed in claim 1, wherein the protrusion portions are positioned in the central portion of the light guide plate, and the cross section of the protrusion portion is V-shaped.

3. The backlight module as claimed in claim 1, wherein the protrusion portions are integrated with the light guide plate.

4. The backlight module as claimed in claim 1, wherein the first opening and the second opening are formed in the central portion of the back cover and the reflective sheet and the first opening having a size and a shape that is the same as that of the second opening.

5. The backlight module as claimed in claim 1, wherein the light source comprises a first light source pattern positioned in a long direction of the light plate, and a second light source pattern positioned in a short direction of the light plate.

6. The backlight module as claimed in claim 5, wherein the first light source pattern is used as the main incident light source of the light guide plate, and the second light source pattern is used as the main incident light source of the light guide pipe.

7. The backlight module as claimed in claim 5, wherein the light source assembly further comprises a bracket between the light sources and the light guide pipe, and the bracket is integrated with the light guide pipe of a material of high reflectance.

8. The backlight module as claimed in claim 5, wherein two end surfaces of the light guide pipe in the long direction are inclined surfaces.

9. The backlight module as claimed in claim 8, wherein the inclined surfaces are attached with a reflective film.

10. The backlight module as claimed in claim 1, wherein the light source assembly further comprises a strip shaped thermal gasket attached in the lamp cover.

* * * * *